United States Patent
Tanikawa et al.

(10) Patent No.: US 8,927,863 B2
(45) Date of Patent: Jan. 6, 2015

(54) ANTI-CORROSION STRUCTURE FOR WIRE CONNECTING PORTION

(75) Inventors: Naotaka Tanikawa, Yokkaichi (JP); Hiroko Kato, Yokkaichi (JP); Kazumasa Kobayashi, Yokkaichi (JP); Eiji Kojima, Yokkaichi (JP); Hiroshi Kobayashi, Okazaki (JP)

(73) Assignee: Sumitomo Wiring Systems, Ltd. (JP)

( * ) Notice: Subject to any disclaimer, the term of this patent is extended or adjusted under 35 U.S.C. 154(b) by 194 days.

(21) Appl. No.: 13/814,105

(22) PCT Filed: Jun. 17, 2011

(86) PCT No.: PCT/JP2011/063897
§ 371 (c)(1),
(2), (4) Date: Feb. 4, 2013

(87) PCT Pub. No.: WO2012/017744
PCT Pub. Date: Feb. 9, 2012

(65) Prior Publication Data
US 2013/0126235 A1 May 23, 2013

(30) Foreign Application Priority Data
Aug. 6, 2010 (JP) ................................. 2010-177446

(51) Int. Cl.
*H01R 4/00* (2006.01)
*H02G 15/04* (2006.01)
*H01R 4/70* (2006.01)
*H01R 4/18* (2006.01)
*H01R 4/62* (2006.01)

(52) U.S. Cl.
CPC .................. *H02G 15/04* (2013.01); *H01R 4/70* (2013.01); *H01R 4/185* (2013.01); *H01R 4/62* (2013.01)
USPC ............ 174/74 R; 174/78; 174/81; 174/74 A; 174/84 R; 174/84 C (58) Field of Classification Search
CPC .............. H01R 4/00; H01R 4/01; H01R 4/02; H01R 4/20; H01R 4/26; H01R 9/00; H01R 9/03; H01R 11/00; H01R 11/12; H01R 11/28; H01R 13/00; H01R 13/42; H01R 13/56; H01R 13/58; H01R 13/62
USPC ............ 174/74 R, 74 A, 78, 76, 79, 80, 84 R, 174/84 C, 92, 93, 94 R; 439/730, 932, 585, 439/578
See application file for complete search history.

(56) References Cited

U.S. PATENT DOCUMENTS 5,532,433 A * 7/1996 Endo et al. .................. 174/84 C
5,795,170 A * 8/1998 Okabe .......................... 439/252
(Continued)

FOREIGN PATENT DOCUMENTS

CN       1158506       9/1997
EP    0 777 302 A1     4/1997
(Continued)

OTHER PUBLICATIONS
International Search Report of Jul. 12, 2011.
(Continued)

*Primary Examiner* — William H Mayo, III
(74) *Attorney, Agent, or Firm* — Gerald E. Hespos; Michael J. Porco; Matthew T. Hespos (57) ABSTRACT

A terminal assembly includes a wire including a core made of metal and covered with a coating, a terminal including a wire connecting portion connected to an end portion of the wire, a sealing resin sealing the wire connecting portion, and a housing including a through hole with a front opening and a rear opening. The terminal is made of a different kind of metal from the core of the wire. The housing accommodates the terminal in the through hole. The wire connecting portion includes an exposed portion not covered with the sealing resin and unexposed portions covered with the sealing resin. The exposed portion is positioned between the unexposed portions in a front and rear direction, thereby protecting the wire connecting portion from electrolytic corrosion. The exposed portion is obtained after the sealing resin is worn by being rubbed against an inner wall of the through hole.

6 Claims, 14 Drawing Sheets

(56) References Cited

U.S. PATENT DOCUMENTS

| | | | |
|---|---|---|---|
| 6,613,263 B2 * | 9/2003 | Kondo | 264/263 |
| 6,761,551 B2 * | 7/2004 | Kondo | 425/116 |
| 6,796,781 B2 * | 9/2004 | Kondo | 425/116 |
| 7,690,954 B2 * | 4/2010 | Watanabe et al. | 439/730 |
| 2001/0003688 A1 * | 6/2001 | Kondo | 439/604 |
| 2009/0186507 A1 | 7/2009 | Watanabe et al. | |
| 2012/0205151 A1 * | 8/2012 | Inoue et al. | 174/72 A |
| 2012/0325552 A1 * | 12/2012 | Sakura | 174/74 R |
| 2013/0052887 A1 * | 2/2013 | Inoue et al. | 439/877 |
| 2013/0056266 A1 * | 3/2013 | Inoue et al. | 174/72 A |
| 2013/0072074 A1 * | 3/2013 | Inoue et al. | 439/886 |
| 2013/0098679 A1 * | 4/2013 | Takata et al. | 174/74 R |
| 2013/0126234 A1 * | 5/2013 | Ono et al. | 174/75 R |
| 2013/0199842 A1 * | 8/2013 | Inoue et al. | 174/84 C |
| 2013/0213709 A1 * | 8/2013 | Kawamura et al. | 174/72 A |
| 2013/0309903 A1 * | 11/2013 | Iio | 439/523 |

FOREIGN PATENT DOCUMENTS

| | | |
|---|---|---|
| JP | 2003-297447 | 10/2003 |
| JP | 2004-111058 | 4/2004 |
| JP | 2010-108798 | 5/2010 |
| JP | 2010-108828 | 5/2010 |
| JP | 2010-108829 | 5/2010 |
| JP | 2011-018489 | 1/2011 |
| JP | 2011-086431 | 4/2011 |
| JP | 2011-113708 | 6/2011 |

OTHER PUBLICATIONS

Chinese Patent Application No. 2014083000076240—Office Action issued on Sep. 3, 2014.

* cited by examiner

ANTI-CORROSION STRUCTURE FOR WIRE CONNECTING PORTION

BACKGROUND OF THE INVENTION

1. Field of the Invention

The present invention relates to an anti-corrosion structure for a wire connecting portion.

2. Description of the Related Art

In recent years, aluminum wires have been used for weight saving and other purposes also in the field of automotive wiring harnesses and the like. An aluminum wire is, for example, structured by covering a core formed by twisting a plurality of aluminum strands with a coating. In the case of forming a wiring harness, the aluminum wire is connected to a wire connecting portion of a terminal. This wire connecting portion is specifically composed of a wire barrel portion to be crimped and connected to an end of the core exposed by stripping the coating at an end of the aluminum wire and an insulation barrel portion to be crimped and connected to an end of the remaining coating.

In electrically conductively connecting a wire to a terminal, if a core of the wire and the terminal are made of different types of metals, particularly if moisture is present in a contact part of the both, electrolytic corrosion is known to occur in which the both metals are dissolved in the form of ions into water and corrosion progresses by an electrochemical reaction. Since the terminal is generally made of copper alloy in view of a problem in strength and the like, electrolytic corrosion is certainly a problem if the aluminum wire is used as described above.

Accordingly, in a terminal disclosed in Japanese Unexamined Patent Publication No. 2003-297447 below, electrolytic corrosion is prevented by sealing a wire connecting portion by a sealing resin (anticorrosive) made of silicone rubber, chelating agent and the like. However, since such a sealing resin entirely covers the wire connecting portion, the wire connecting portion is formed to be one size larger. Thus, a stepped part is formed on the terminal to avoid the interference of the sealing resin with a housing, into which this terminal is to be mounted, and the interference of the sealing resin and the housing is avoided by this stepped part.

However, in the above configuration, the housing is open upward and the wire connecting portion can be arranged while being displaced upward, but the sealing resin interferes with the inner wall of a through hole provided in the housing if the wire connecting portion is displaced upward in the case of accommodating the terminal into the through hole. On the other hand, even if a clearance between the inner wall of the through hole and the sealing resin is enlarged by carving the inner wall of the through hole, there is a limit in terms of securing the strength of the housing.

SUMMARY OF INVENTION

The present invention was developed based on the situation as described above and an object thereof is to prevent electrolytic corrosion of a wire connecting portion while permitting the interference of a sealing resin and the inner wall of a through hole.

The terminal assembly according to the present invention includes a wire including a core made of metal and covered with a coating; a terminal made of a metal different from the core and including a wire connecting portion connected to an end of the wire; a sealing resin sealing the wire connecting portion; and a housing including a through hole with a front opening and a rear opening. The terminal is made of a different kind of metal from the core of the wire. The housing accommodates the terminal in the through hole. The wire connecting portion includes an exposed portion not covered with the sealing resin and unexposed portions covered with the sealing resin. The exposed portion is obtained after the sealing resin is rubbed against an inner wall of the through hole. The exposed portion is arranged in an intermediate part of the wire connecting portion excluding a front end part and a rear end part thereof.

If the wire connecting portion is partly exposed at the both front and rear end parts thereof due to the interference of the sealing resin with the inner wall of the through hole, interfaces between the sealing resin and the wire are exposed and water tends to enter the wire connecting portion through these interfaces. In this respect, according to the configuration of the present invention, a part (exposed portion) of the wire connecting portion is exposed in the intermediate part of the wire connecting portion and an interface between the sealing resin and the wire connecting portion is exposed at the exposed portion. However, since the sealing resin and the wire connecting portion are held in close contact with each other, water does not enter the wire connecting portion through this interface. Thus, electrolytic corrosion of the wire connecting portion can be prevented while the interference of the sealing resin and the inner wall of the through hole is permitted.

DETAILED DESCRIPTION OF THE PREFERRED EMBODIMENTS

First Embodiment

A first embodiment of the present invention is described in detail with reference to FIGS. 1 to 10. A terminal 10 in this embodiment is made of copper alloy and includes a terminal connecting portion 20 connectable to a male terminal (see FIG. 11) and a wire connecting portion 30 formed behind this terminal connecting portion 20. This terminal 10 is inserted and accommodated from behind into a through hole 41 formed to penetrate a housing 40 in forward and backward directions. A locking lance 42 extending forward in a cantilever manner is formed in the through hole 41. This locking lance 42 is engaged with the terminal 10, whereby the terminal 10 is held in the through hole 41 so as not to come out backward.

Figure 1:
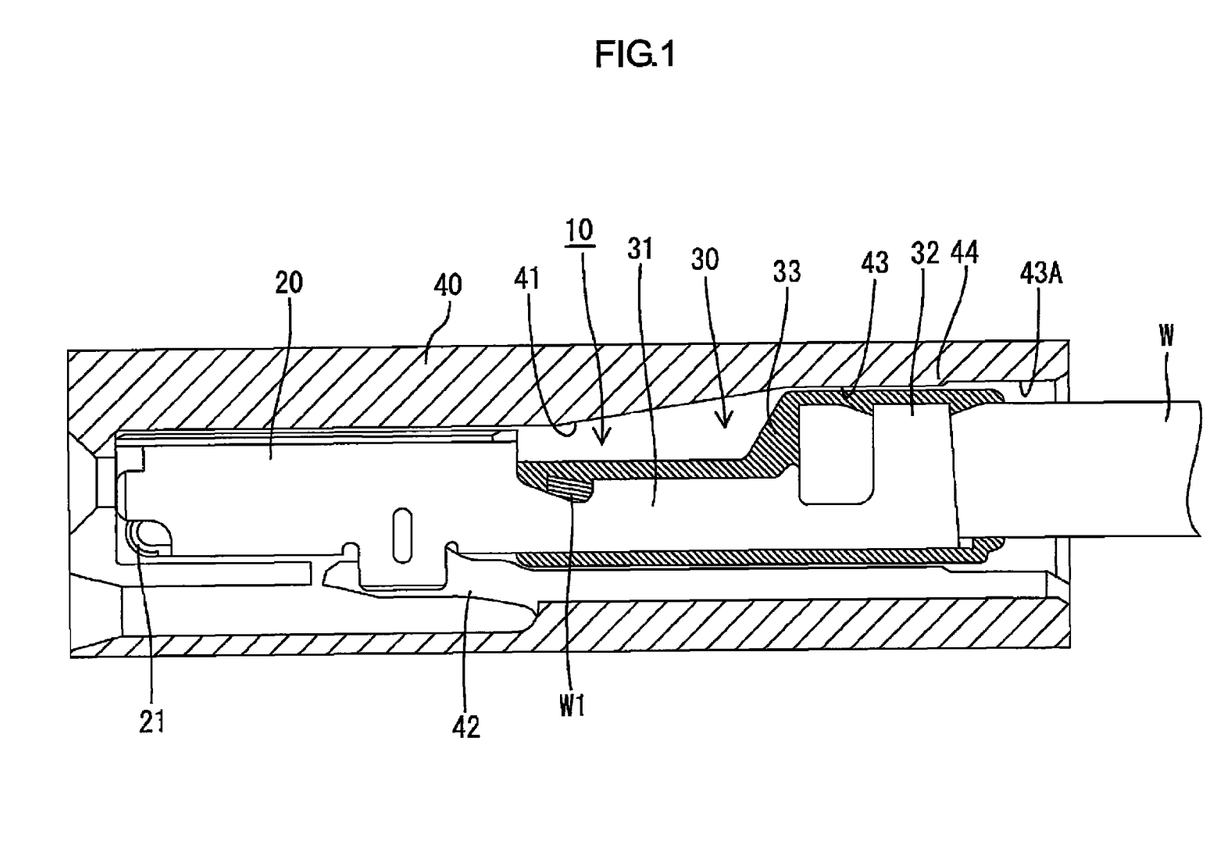
FIG. 1 is a section showing a state where a terminal in a first embodiment is inserted in a proper posture in a through hole when viewed sideways.

The terminal connecting portion 20 is in the form of a rectangular tube which is open forward and backward, and the male terminal is fittable thereinto through a front end opening thereof. Further, a resilient contact piece 21 is formed in the terminal connecting portion 20 by being folded backward from the front edge of the bottom wall of the terminal connecting portion 20. This resilient contact piece 21 is resiliently deformable in a vertical direction, and resiliently comes into contact with the male terminal fitted into the terminal connecting portion 20. In this way, the male terminal is sandwiched between the resilient contact piece 21 and the ceiling wall of the terminal connecting portion 20 and the terminal 10 and the male terminal are electrically conductively connected.

The terminal connecting portion 20 is formed with a lance hole (not shown) into which a projection (not shown) formed on the locking lance 32 is fitted for a locking purpose. Since the opening of this lance hole is one size larger than the projection, a clearance is formed between the edge of the opening and the projection. Thus, the terminal 10 is permitted to move in forward and backward directions by as much as the clearance. In this way, the terminal 10 is made loosely movable in forward and backward directions between an advanced position (position of the terminal 10 shown in FIG. 3) and a retracted position (position of the terminal 10 shown in FIG. 5).

The wire connecting portion 30 is connected to an end of an aluminum wire W formed by covering a core W1 made of aluminum or aluminum alloy with an insulating coating. On the other hand, the terminal 10 is made of copper alloy. Thus, the connection of the core W1 of the aluminum wire W and the wire connecting portion 30 is the connection of different types of metals having different ionization tendencies. This wire connecting portion 30 is composed of a wire barrel portion 31 to be crimped and connected to the core W1 exposed by stripping the coating at an end of the aluminum wire W and an insulation barrel portion 32 to be crimped and connected to the remaining coating after stripping.

Figure 7:
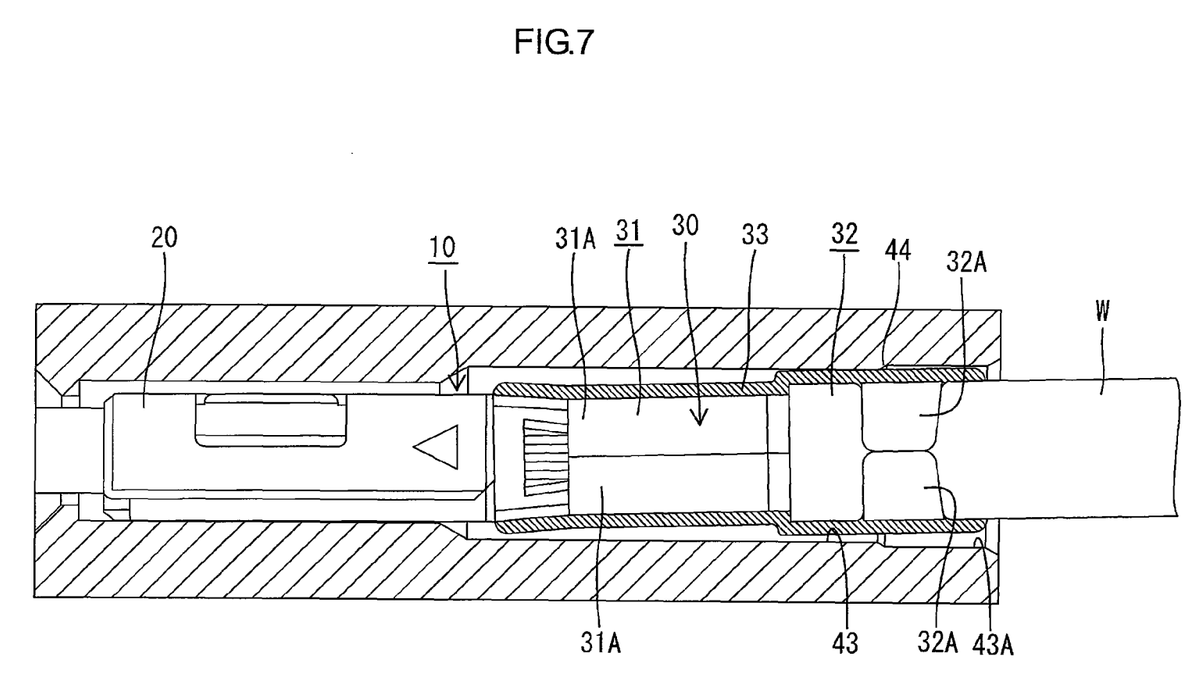
FIG. 7 is a section showing the state where the stepped part interferes with the sealing resin at the advanced position when viewed from above.

As shown in FIG. 7, the wire barrel portion 31 includes a pair of barrel pieces 31A in the form of an open barrel and is crimped to pierce into the core W1 while the both barrel pieces 31A are wound around the core W1 from both left and right sides.

On the other hand, as shown in FIGS. 1 and 7, the insulation barrel portion 32 is formed to be one size larger than the wire barrel portion 31, wherein particularly a vertical dimension thereof is about twice as large as that of the wire barrel portion 31. This insulation barrel portion 32 includes a pair of barrel pieces 32A in the form of an open barrel and is crimped while the both barrel pieces 31A are wound around the coating from both left and right sides at the end of the aluminum wire W.

A barrel accommodating portion 43 for accommodating the both barrel pieces 32A of the insulation barrel portion 32 is formed in the through hole 41. The barrel accommodating portion 43 is formed by radially widening a rear end opening side of the through hole 41 and a stepped part 44 is formed at the front end of this enlarged diameter portion 43A. The stepped part 44 is arranged substantially in the center of the barrel accommodating portion 43 in forward and backward directions and formed over the entire circumference.

Figure 2:
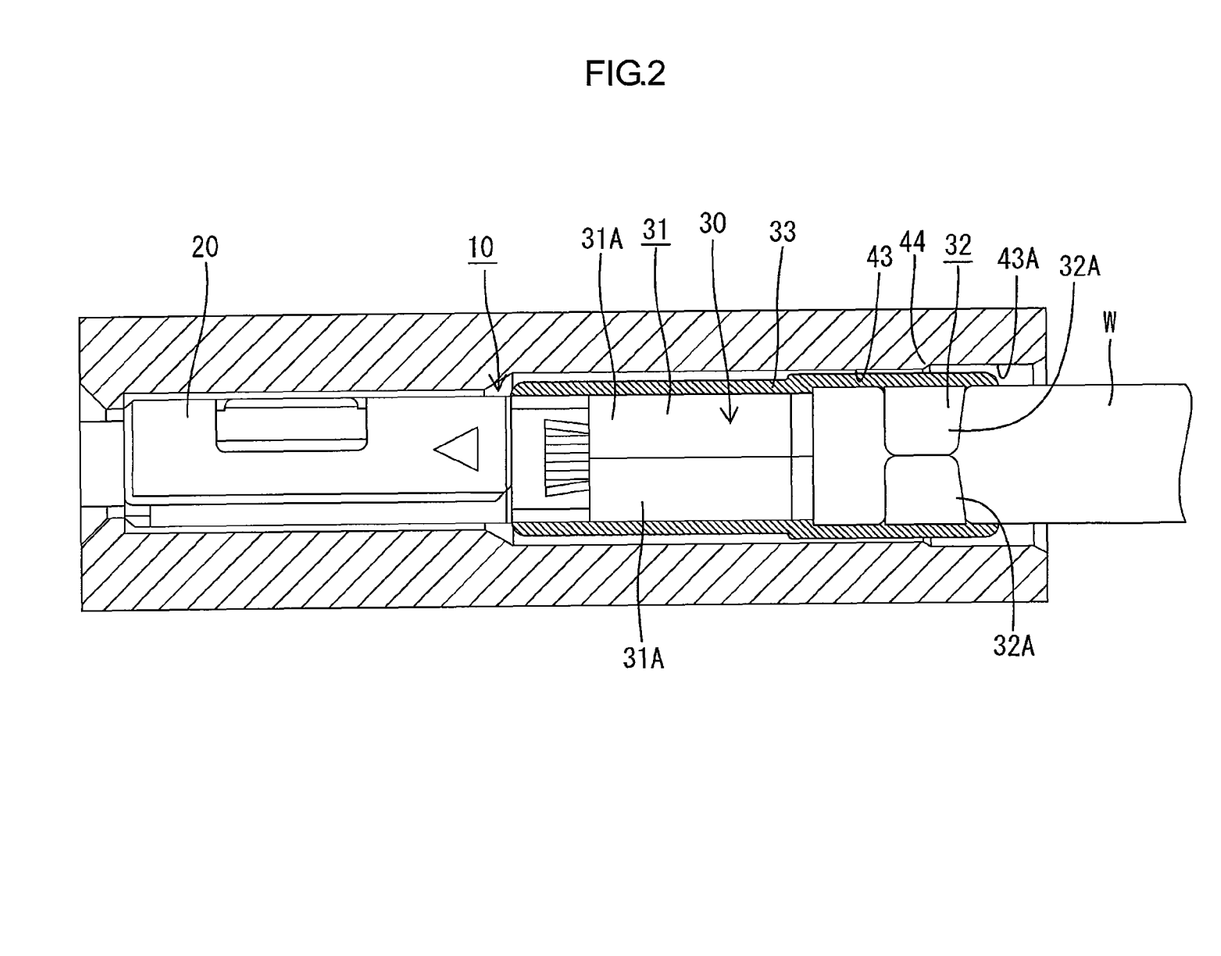
FIG. 2 is a section of the terminal in FIG. 1 when viewed from above.

The wire connecting portion 30 includes a sealing resin 33 sealed by resin such as silicone rubber or chelating agent. The wire barrel portion 31 and the insulation barrel portion 32 are both embedded in a sealed state by the sealing resin 33. Thus, water does not enter the wire connecting portion 30 and electrolytic corrosion can be prevented even if different types of metals are connected. Further, as shown in FIGS. 1 and 2, the sealing resin 33 is not in contact with the inner wall of the through hole 41 in the case of insertion in a proper posture into the through hole 41. In this case, the inner wall of the through hole 41 and the sealing resin 33 do not slide against each other and the sealing resin 33 is not scraped.

However, the sealing resin 33 interferes with the inner wall of the through hole 41 due to loose movements of the terminal 10A in forward and backward directions between the advanced position and the retracted position and due to vertical and lateral swinging movements of the aluminum wire W. As a result, the sealing resin 33 is gradually scraped due to repeated sliding movements against the inner wall of the through hole 41. Thus, an exposed portion 34 which is exposed parts of the both barrel pieces 32A comes to be arranged on outer peripheral surfaces 32C formed between both front and rear end surfaces 32F, 32R of the both barrel pieces 32A of the insulation barrel portion 32.

Figure 3:
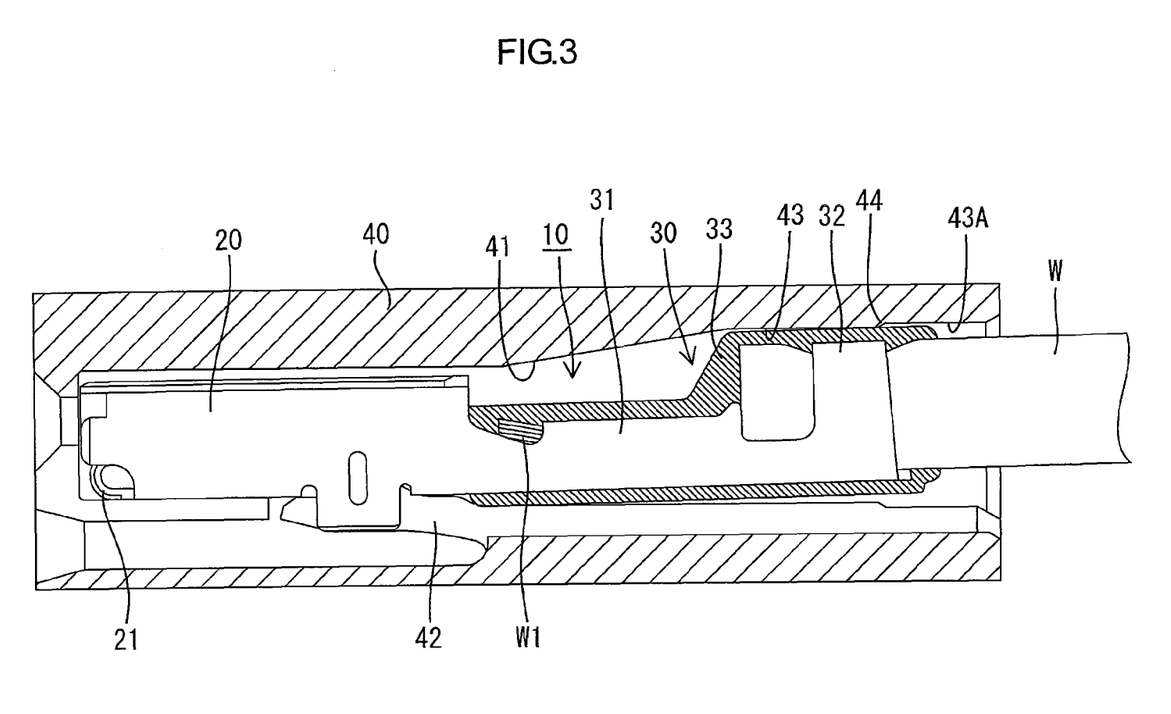
FIG. 3 is a section showing a state where a stepped part interferes with a sealing resin at an advanced position when viewed sideways.
Figure 4:
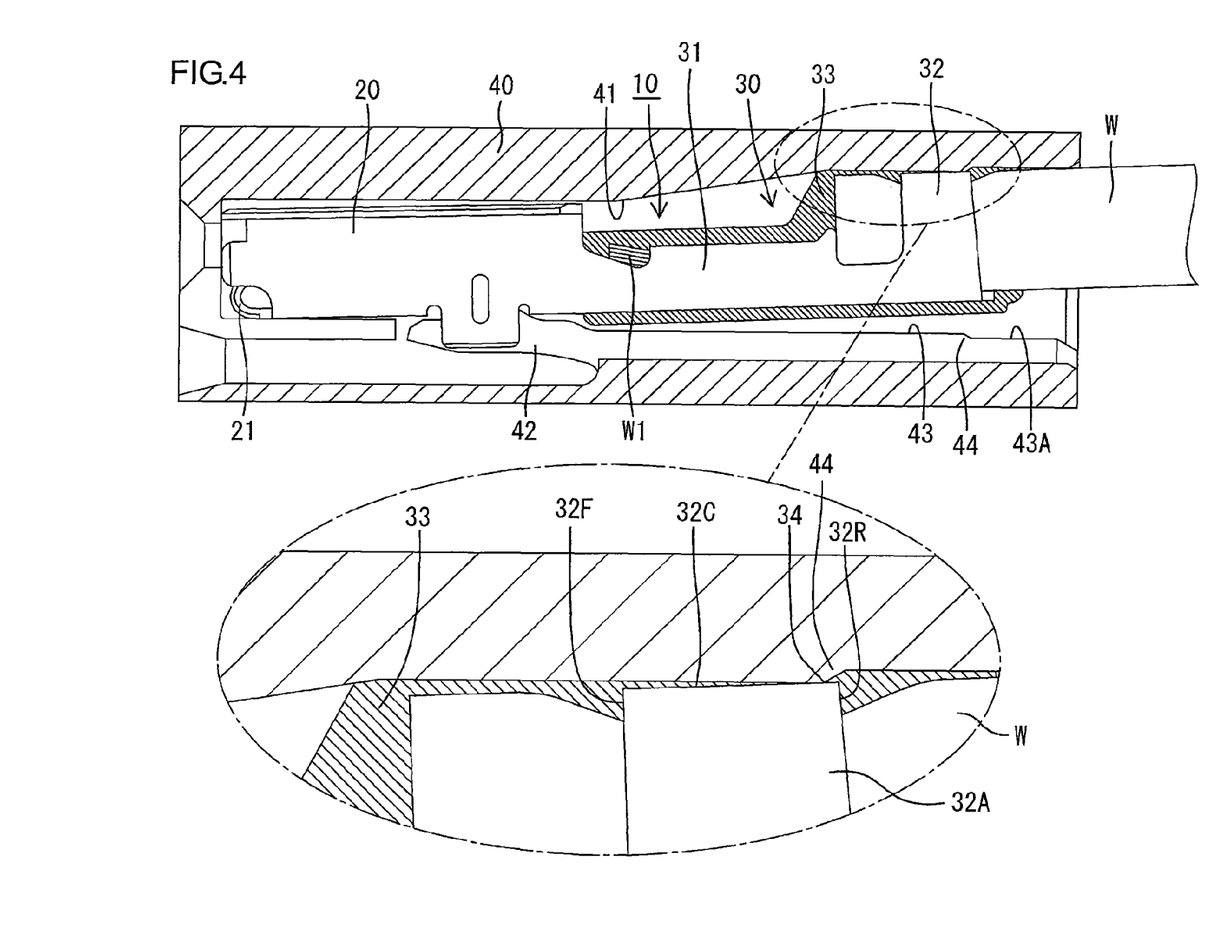
FIG. 4 is a section showing a state where the stepped part is in contact with an exposed portion at the advanced position when viewed sideways.

Specifically, as shown in FIG. 3, the stepped part 44 comes into line contact with the sealing resin 33 and slides against it due to an upward swinging movement of the aluminum wire W at the advanced position. If the sealing resin 33 is scraped by the stepped part 44 at the advanced position, the stepped part 44 comes into contact with the exposed portion 34 arranged on the outer peripheral surfaces 32C of the both barrel pieces 32A as shown in FIG. 4. Here, although interfaces between the sealing resin 33 and the outer peripheral surfaces 32C of the both barrel pieces 32A are exposed at the exposed portion 34, water does not enter the wire connecting portion 30 through these interfaces since the sealing resin 33 and the outer peripheral surfaces 32C of the both barrel pieces 32A are held in close contact at these interfaces.

Figure 5:
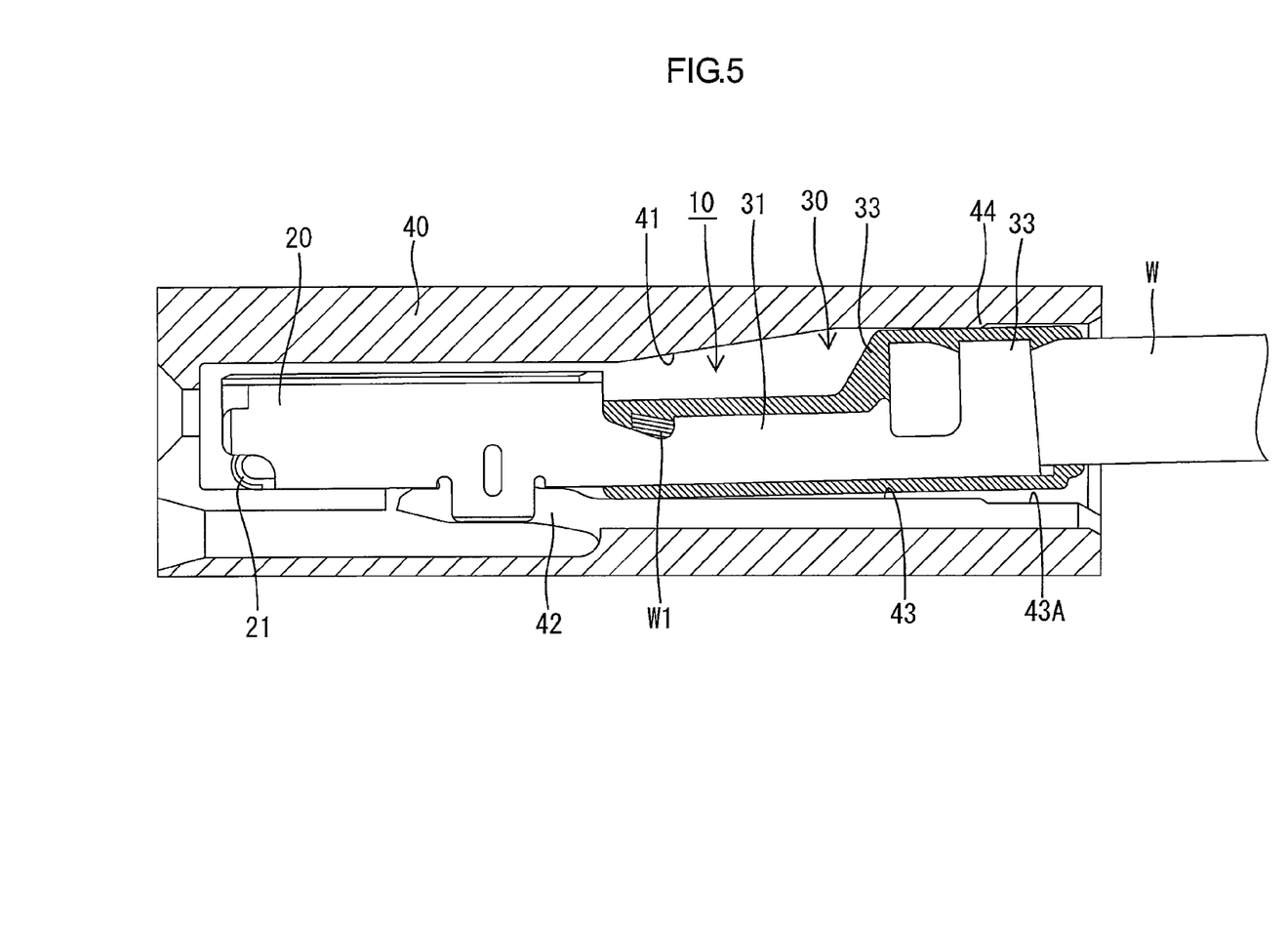
FIG. 5 is a section showing a state where the stepped part interferes with the sealing resin at a retracted position when viewed sideways.
Figure 6:
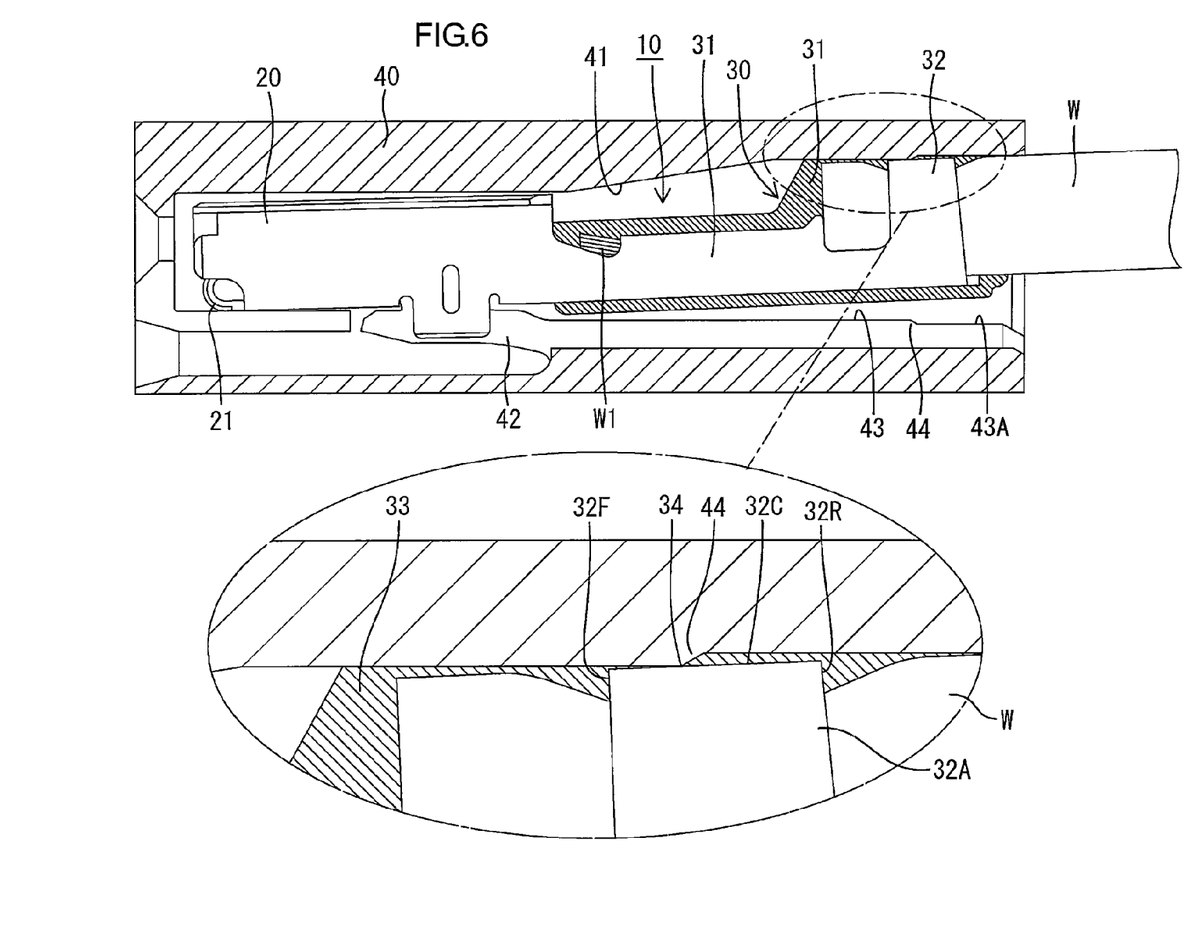
FIG. 6 is a section showing a state where the stepped part is in contact with the exposed portion at the retracted position when viewed sideways.

Further, as shown in FIG. 5, the stepped part 44 comes into line contact with the sealing resin 33 and slides against it due to an upward swinging movement of the aluminum wire W at the retracted position. If the sealing resin 33 is scraped by the stepped part 44 at the retracted position, the interfaces between the sealing resin 33 and the outer peripheral surfaces 32C of the both barrel pieces 32A are exposed at the exposed portion 34 as shown in FIG. 6, but water does not enter the wire connecting portion 30 through these interfaces since the sealing resin 33 and the outer peripheral surfaces 32C of the both barrel pieces 32A are held in close contact at these interfaces.

Figure 8:
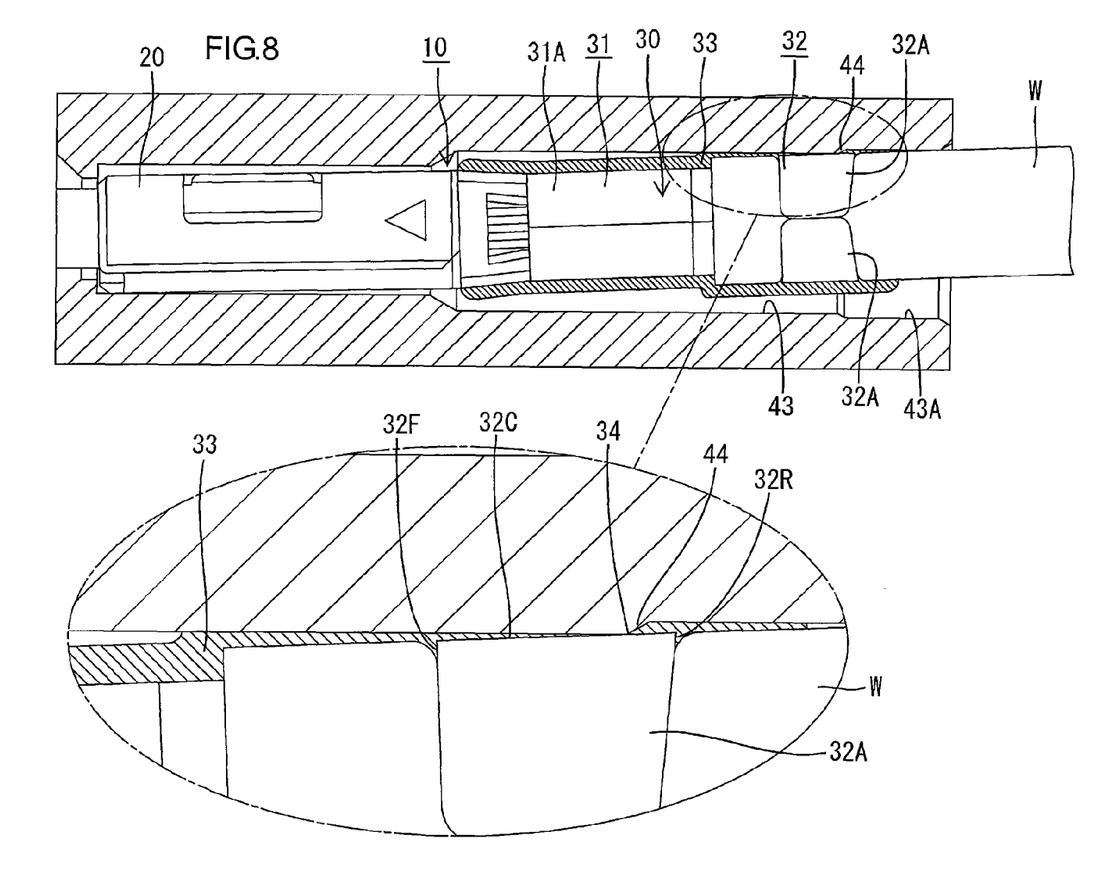
FIG. 8 is a section showing the state where the stepped part is in contact with the exposed portion at the advanced position when viewed from above.
Figure 9:
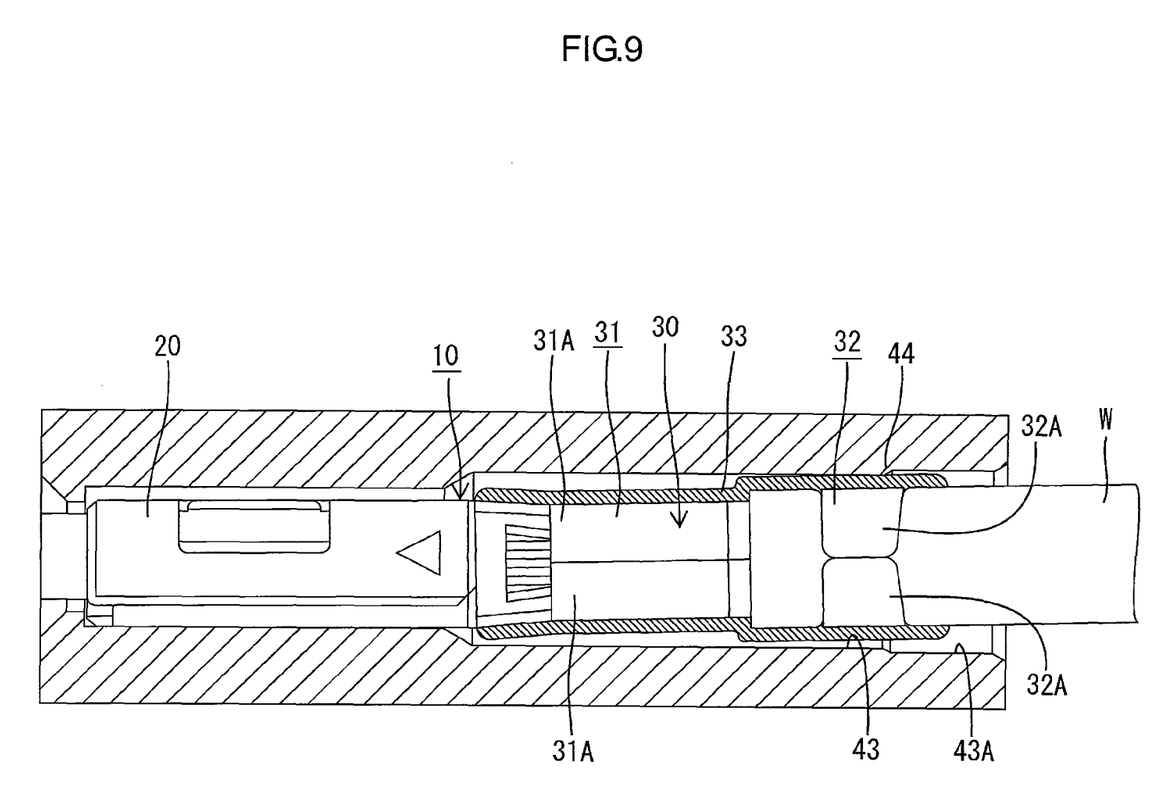
FIG. 9 is a section showing the state where the stepped part interferes with the sealing resin at the retracted position when viewed from above.
Figure 10:
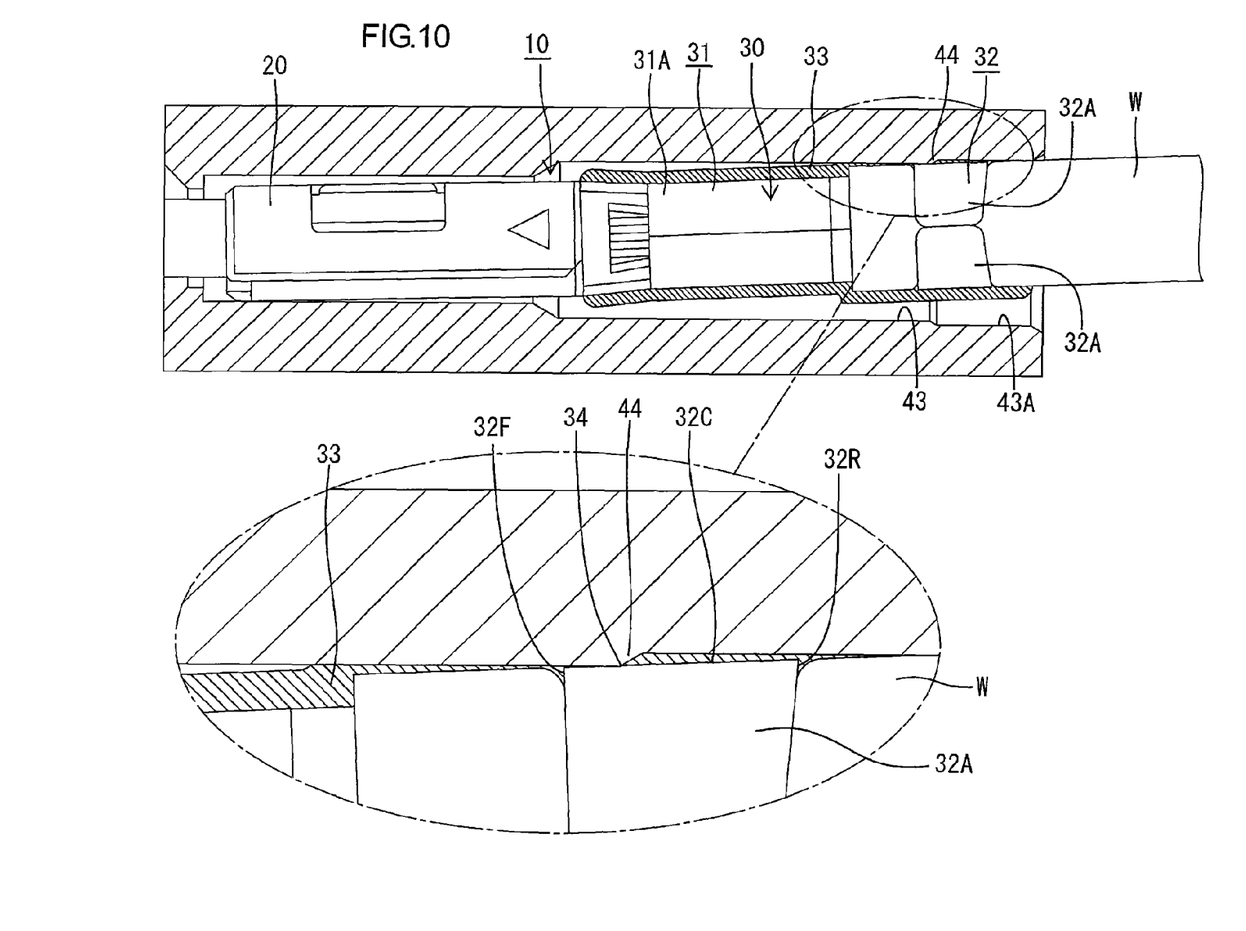
FIG. 10 is a section showing the state where the stepped part is in contact with the exposed portion at the retracted position when viewed from above.

Similarly, FIGS. 7 and 8 show a case where the aluminum wire W is laterally swung at the advanced position. The configuration, function and effect of this case are not described since being the same as in the case where the aluminum wire W is swung upwardly. Further, FIGS. 9 and 10 show a case where the aluminum wire W is laterally swung at the retracted position. The configuration, function and effect of this case are not described since being the same as in the case where the aluminum wire W is swung upwardly.

As described above, according to this embodiment, the interference of the stepped part 44 and the sealing resin 33 due to a swinging movement of the aluminum wire W is permitted. However, even if the sealing resin 33 is scraped to expose the exposed portion 34, the exposed portion 34 is arranged between the front and rear end surfaces 32F, 32R of the both barrel pieces 32A, i.e. on the outer peripheral surfaces 32C. Thus, the entrance of water into the wire connecting portion 30 through the exposed portion 34 can be avoided. Therefore, electrolytic corrosion of the wire connecting portion 30 can be prevented. Further, when the terminal 10 is inserted in a proper posture into the through hole 41, the interference of the sealing resin 33 with the barrel accommodating portion 43 can be avoided. Furthermore, since the stepped part 44 comes into line contact with the sealing resin 33, an exposed area of the exposed portion 34 can be reduced.

Second Embodiment

Next, a second embodiment of the present invention is described with reference to FIGS. 11 to 14. In this embodiment, the terminal of the present invention is applied to a male terminal. A terminal 50 of this embodiment is connectable to a female terminal (see FIG. 1). The terminal 50 includes a tab portion 51 to be fitted into the female terminal. The tab portion 51 is in the form of a flat plate. The other configuration, functions and effects are the same as in the first embodiment and not repeatedly described.

Figure 11:
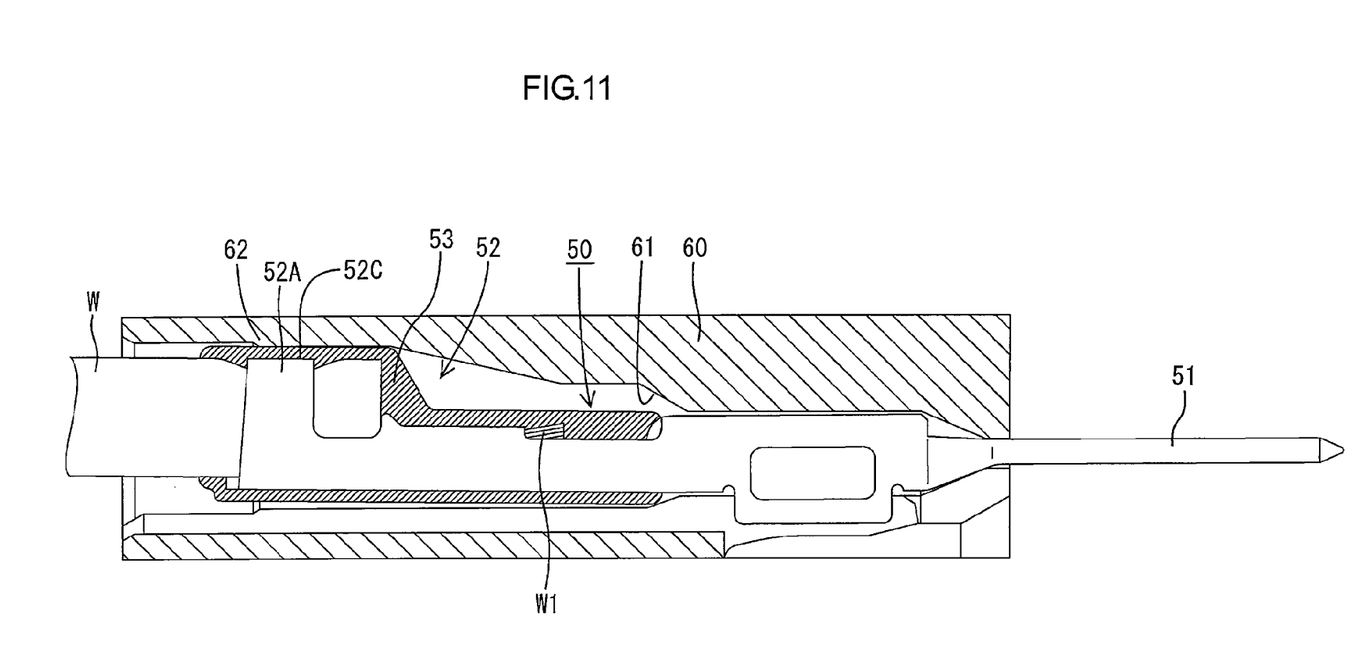
FIG. 11 is a section showing a terminal in a second embodiment in a state where a stepped part interferes with a sealing resin when viewed sideways.
Figure 12:
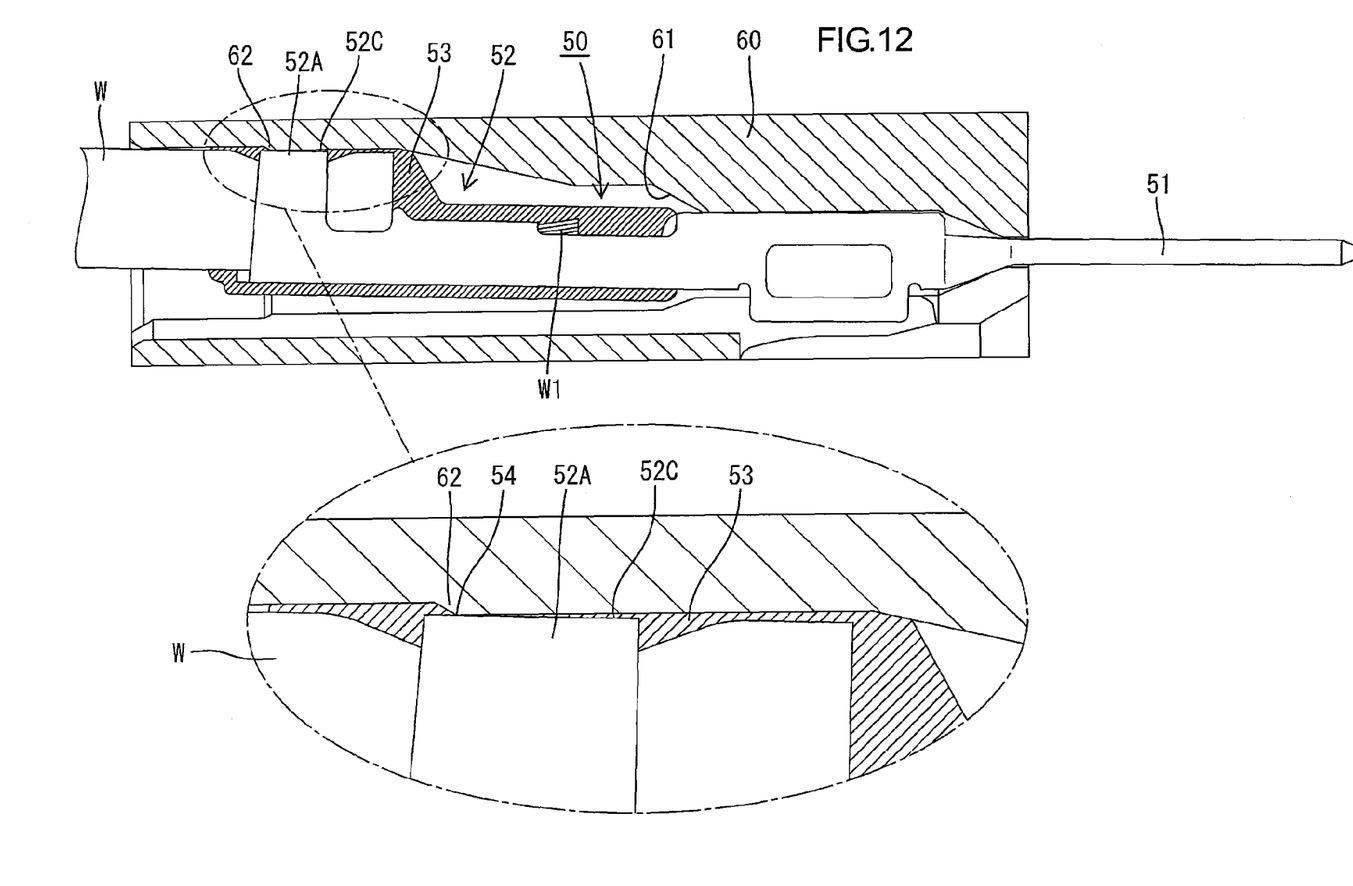
FIG. 12 is a section showing a state where the stepped part is in contact with an exposed portion when viewed sideways.

FIG. 11 shows a state where a stepped part 62 formed on the inner wall of a through hole 61 of a housing 60 interferes with a sealing resin 53 sealing a wire connecting portion 52 of the terminal 50 with resin due to an upward swinging movement of an aluminum wire W at an advanced position. FIG. 12 shows a state where the stepped part 62 comes into line contact with an exposed portion 54 exposed on outer peripheral surfaces 52C of both barrel pieces 52A forming the wire connecting portion 52 due to sliding movements of the sealing resin 53 and the stepped part 62 against each other.

Figure 13:
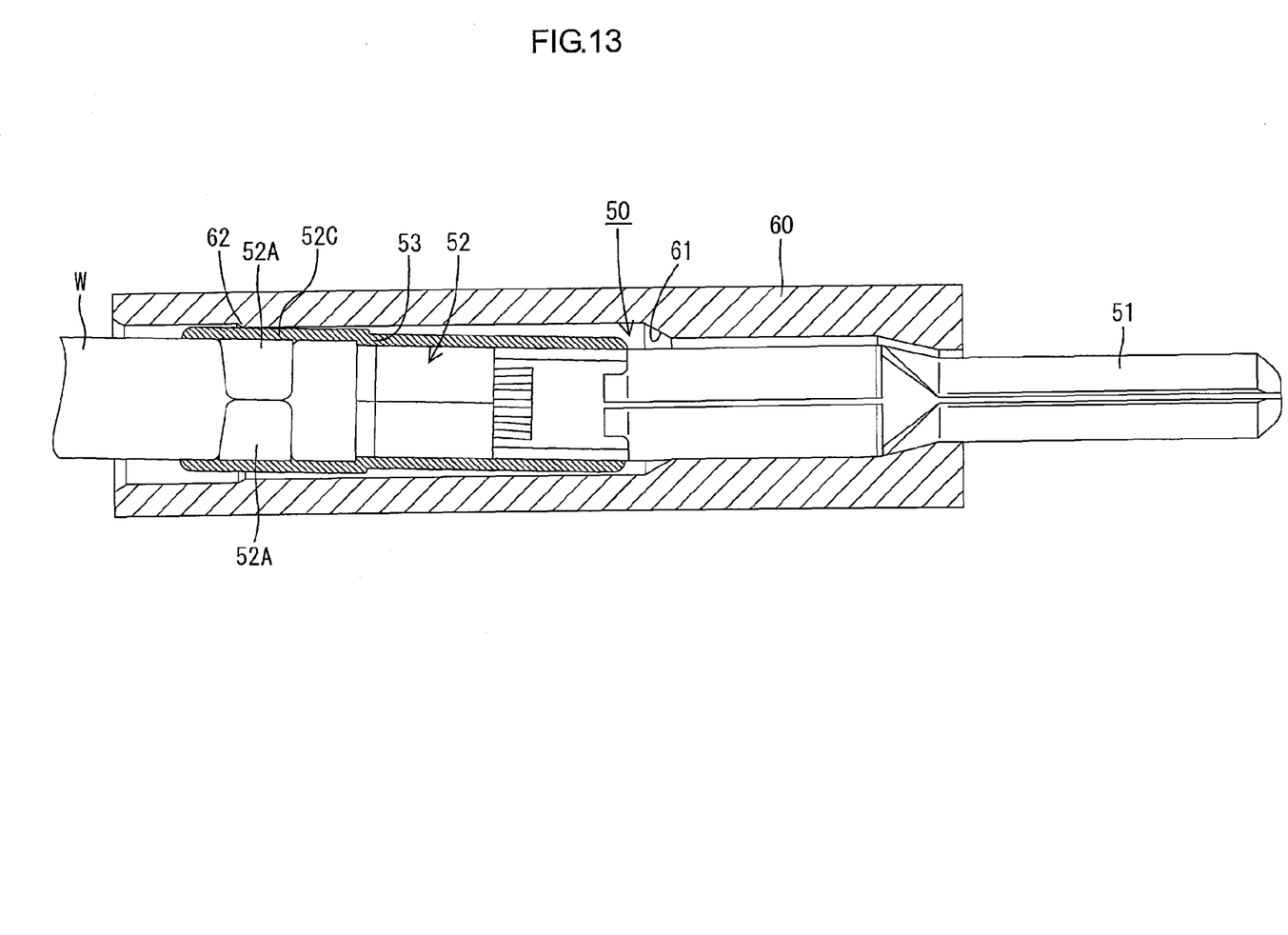
FIG. 13 is a section showing the state where the stepped part interferes with the sealing resin when viewed from above.
Figure 14:
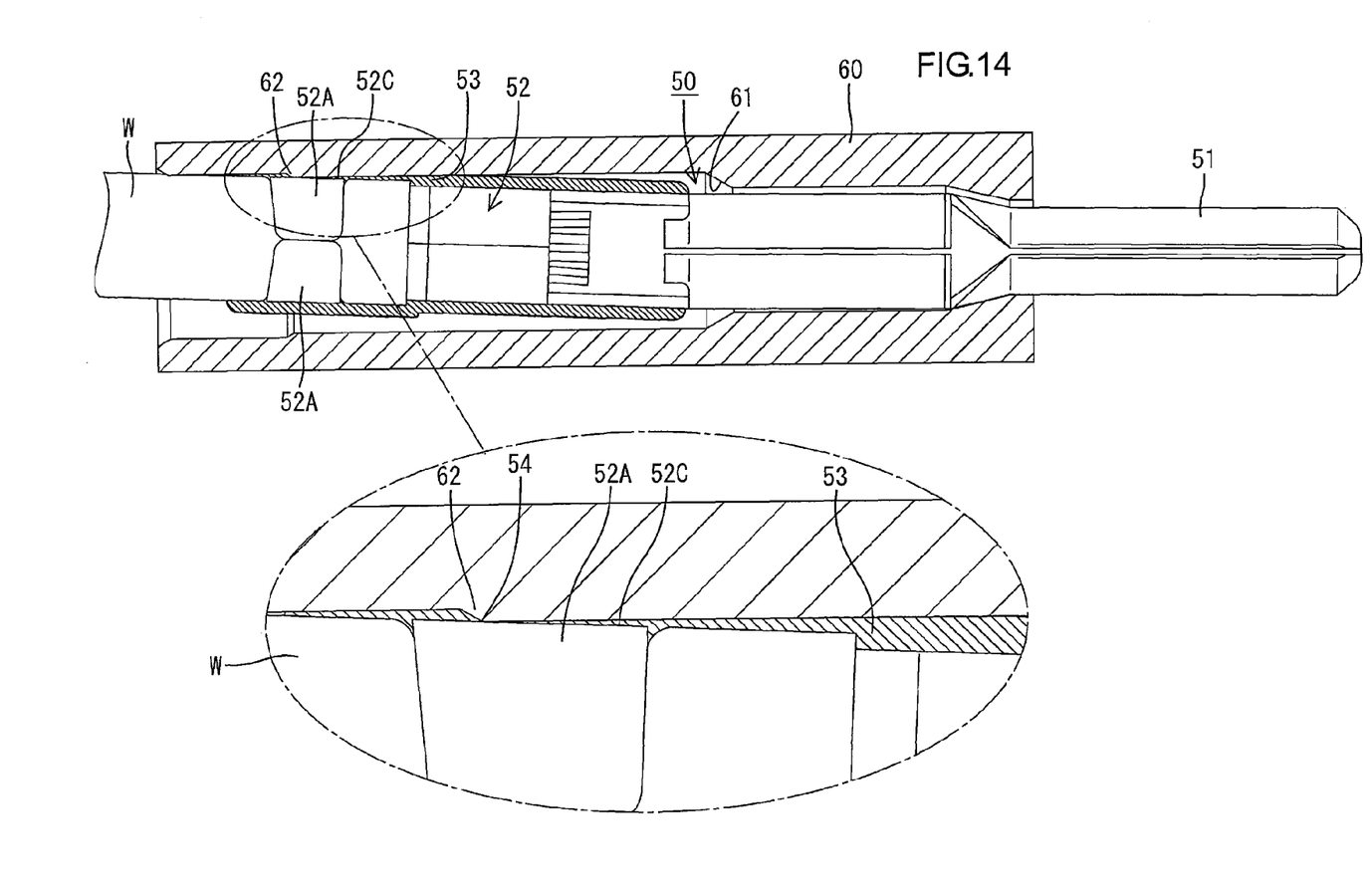
FIG. 14 is a section showing the state where the stepped part is in contact with the exposed portion when viewed from above.

FIG. 13 shows a state where the stepped part 62 interferes with the sealing resin 53 due to a lateral swinging movement of the aluminum wire W at the advanced position. FIG. 14 shows a state where the stepped part 62 comes into line contact with the exposed portion 54 exposed on the outer peripheral surfaces 52C of the both barrel pieces 52A due to sliding movements of the sealing resin 53 and the stepped part 62 against each other.

Also in this embodiment, interfaces between the sealing resin 53 and the outer peripheral surfaces 52C of the both barrel pieces 52A are exposed at the exposed portion 54. However, water does not enter the wire connecting portion 52 through these interfaces since the sealing resin 53 and the outer peripheral surfaces 52C of the both barrel pieces 52A are held in close contact at these interfaces. Thus, electrolytic corrosion at the wire connecting portion 52 can be prevented.

Other Embodiments

The present invention is not limited to the above described and illustrated embodiments. For example, the following embodiments are also included in the technical scope of the present invention.

Although the stepped part comes into line contact with the outer peripheral surfaces of the both barrel pieces of the insulation barrel portion in the above embodiments, it may come into line contact with the outer peripheral surfaces of the both barrel pieces of the wire barrel portion according to the present invention.

Although the insulation barrel portion is in the form of an open barrel including the pair of barrel pieces in the above embodiments, it may be in the form of a closed barrel having a cylindrical shape according to the present invention.

Although the stepped part is formed in the barrel accommodating portion for accommodating the insulation barrel portion in the above embodiments, it may be formed in the inner wall of the through hole accommodating the wire barrel portion according to the present invention.

Although the sealing resin does not come into contact with the inner wall of the through hole when the terminal is inserted in a proper posture into the through hole in the above embodiments, it may be more or less pressed into the through hole according to the present invention.

Although the wire connecting portion is crimped and connected to the core made of aluminum in the above embodiments, soldering may be applied to the core and then the wire connecting portion may be crimped and connected to this soldered core according to the present invention.

Although a combination of aluminum and copper alloy is illustrated as a combination of different types of metals in the above embodiments, another combination may be adopted according to the present invention.

The wire may have an exposed end portion not covered with the coating and a coating portion covered with the coating. The wire connecting portion may include a wire barrel portion and an insulation barrel portion. The wire barrel portion may be crimped onto the exposed end portion. The insulation barrel portion may include a barrel piece crimped onto the coated portion. The exposed portion of the wire connecting portion may be located at an outer peripheral surface of the barrel piece. The outer peripheral surface may be located between edges of the barrel piece in the front and rear direction. According to such a configuration, an interface between the sealing resin and the outer peripheral surface of the barrel piece is exposed at the exposed portion exposed on the outer peripheral surface of the barrel. However, since the sealing resin and the outer peripheral surface of the barrel piece are held in close contact with each other, water does not enter the wire connecting portion through this interface.

The through hole may include a barrel accommodating portion in which the barrel piece is accommodated. The barrel accommodating portion includes an enlarged diameter portion at a position close to the rear opening of the housing and a small diameter portion on a front side of the enlarged diameter portion. The enlarged diameter portion has a larger diameter than the small diameter portion so that a stepped part is provided therebetween. The stepped part is located at a position corresponding to the exposed portion of the wire connecting portion. According to such a configuration, an exposed area of the exposed portion can be reduced since the stepped part comes into line contact with the sealing resin.

An inner wall of the barrel accommodating portion may be in non-contact with the sealing resin when the terminal is in an original position in the through hole. According to such a configuration, the interference of the sealing resin with the inner wall of the through hole can be avoided when the terminal is inserted in the proper posture into the through hole.

The core of the wire may be made of one of aluminum or aluminum alloy and the terminal may be made of copper alloy. According to such a configuration, the occurrence of electrolytic corrosion can be prevented effectively even in the case of using an aluminum wire having a high possibility of electrolytic corrosion.

According to the present invention, it is possible to prevent electrolytic corrosion of a wire connecting portion while permitting the interference of a sealing resin and the inner wall of a through hole.

The invention claimed is:

1. A terminal assembly comprising:
a wire including a core made of metal and covered with a coating;
a terminal including a wire connecting portion connected to an end of the wire, the terminal being made of a different kind of metal from the core of the wire;
a sealing resin sealing the wire connecting portion; and
a housing including a through hole with a front opening and a rear opening, the housing accommodating the terminal in the through hole,
wherein the wire connecting portion includes an exposed portion not covered with the sealing resin and unexposed portions covered with the sealing resin, the exposed portion being positioned between the unexposed portions in a front and rear direction, thereby protecting the wire connecting portion from electrolytic corrosion, the exposed portion being obtained after the sealing resin is worn by being rubbed against an inner wall of the through hole.

2. The terminal assembly according claim 1, wherein
the wire has an exposed end portion not covered with the coating and a coated portion covered with the coating,
the wire connecting portion includes a wire barrel portion and an insulation barrel portion, the wire barrel portion being crimped onto the exposed end portion, the insulation barrel portion including a barrel piece crimped onto the coated portion, and
the exposed portion of the wire connecting portion is located an outer peripheral surface of the barrel piece, the outer peripheral surface being located between edges of the barrel piece in the front and rear direction.

3. The terminal assembly according to claim 1, wherein
the through hole includes a barrel accommodating portion in which the barrel pieces is accommodated,
the barrel accommodating portion includes an enlarged diameter portion at a position to the rear opening of the housing and a small diameter portion on a front side of the enlarged diameter portion, the enlarged diameter portion having a larger diameter than the small diameter portion, whereby a stepped part is provided therebetween, and
the stepped part is located at a position corresponding to the exposed portion of the wire connecting portion.

4. The terminal assembly according to claim 3, wherein an inner wall of the barrel accommodating portion is in non-contact with the sealing resin when the terminal is in an original position in the through hole.

5. The terminal assembly according to claim 3, wherein the stepped part is provided over an entire circumference of the barrel accommodating portion.

6. The terminal assembly according to claim 1, wherein
the core of the wire is made of one of aluminum and aluminum alloy, and
the terminal is made of copper alloy.

* * * * *